US012584295B2

(12) United States Patent
Itou et al.

(10) Patent No.: US 12,584,295 B2
(45) Date of Patent: Mar. 24, 2026

(54) WORK MACHINE

(71) Applicant: Hitachi Construction Machinery Co., Ltd., Tokyo (JP)

(72) Inventors: Ryousuke Itou, Tsuchiura (JP); Hiroaki Amano, Tsukuba (JP); Kento Kumagai, Ami-machi (JP); Shinji Nishikawa, Kasumigaura (JP); Akihiro Narazaki, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 29 days.

(21) Appl. No.: 18/845,017

(22) PCT Filed: Mar. 10, 2023

(86) PCT No.: PCT/JP2023/009422

§ 371 (c)(1),
(2) Date: Sep. 9, 2024

(87) PCT Pub. No.: WO2023/182010

PCT Pub. Date: Sep. 28, 2023

(65) Prior Publication Data

US 2025/0263909 A1 Aug. 21, 2025

(30) Foreign Application Priority Data

Mar. 22, 2022 (JP) ................................ 2022-045731

(51) Int. Cl.
*E02F 9/22* (2006.01)
*F15B 11/04* (2006.01)

(52) U.S. Cl.
CPC .......... *E02F 9/2235* (2013.01); *E02F 9/2285* (2013.01); *E02F 9/2296* (2013.01);
(Continued)

(58) Field of Classification Search
CPC ..... E02F 9/2235; E02F 9/2285; E02F 9/2296; E02F 9/2228; F15B 11/04;
(Continued)

(56) References Cited

U.S. PATENT DOCUMENTS

2021/0262200 A1 8/2021 Moriki et al.
2021/0332563 A1 10/2021 Kanazawa et al.

FOREIGN PATENT DOCUMENTS

JP 2017-20233 A 1/2017
JP 2020-41603 A 3/2020
(Continued)

OTHER PUBLICATIONS

International Preliminary Report on Patentability (PCT/IB/338 & PCT/IB/373) issued in PCT Application No. PCT/JP2023/009422 dated Oct. 3, 2024, including English translation (Japanese-language Written Opinion (PCT/ISA/237), filed on Sep. 9, 2024) (5 pages).

(Continued)

*Primary Examiner* — Erin M Piateski
*Assistant Examiner* — Hajar Hassaniardekani
(74) *Attorney, Agent, or Firm* — Crowell & Moring LLP

(57) ABSTRACT

The present invention aims to provide a working machine capable of improving the responsiveness of the driving speed to the target speed of the hydraulic actuator. For this purpose, the controller calculates the target speed of the boom according to the input amount of the operation lever, calculates the actuator target flow rate based on the target speed, calculates the pump target flow rate based on the actuator target flow rate, and based on the input amount of the operation lever, the output value of the inertia measuring device, and the meter-out pressure of the actuator, calculates the target meter-in pressure, which is the target value of the actuator's meter-in pressure, calculates the difference (Continued)

between the driving speed of the boom and the target speed as a speed error, calculates the difference between the meter-in pressure and the target meter-in pressure as a pressure error, and corrects the pump target flow rate according to the speed error and the pressure error.

3 Claims, 11 Drawing Sheets

(52) U.S. Cl.
CPC ..... *F15B 11/04* (2013.01); *F15B 2211/20546* (2013.01); *F15B 2211/6306* (2013.01); *F15B 2211/6654* (2013.01)

(58) Field of Classification Search
CPC .... F15B 2211/20546; F15B 2211/6306; F15B 2211/6654; F15B 2211/20523; F15B 21/087; F15B 2211/6309; F15B 2211/6313; F15B 2211/633; F15B 2211/6336; F15B 2211/6346; F15B 2211/665; F15B 2211/6652; F15B 11/00; F15B 11/044
See application file for complete search history.

(56) References Cited

FOREIGN PATENT DOCUMENTS

| | | | | | |
|---|---|---|---|---|---|
| JP | 2020-133705 | A | | 8/2020 | |
| WO | WO 2015/025818 | A1 | | 2/2015 | |
| WO | WO-2015092933 | A1 | * | 6/2015 | ............ F15B 15/088 |
| WO | WO-2020194732 | A1 | * | 10/2020 | ............ E02F 9/2033 |

OTHER PUBLICATIONS

International Search Report (PCT/ISA/210) issued in PCT Application No. PCT/JP2023/009422 dated May 9, 2023 with English translation (4 pages).

Japanese-language Written Opinion (PCT/ISA/237) issued in PCT Application No. PCT/JP2023/009422 dated May 9, 2023 with English translation (6 pages).

* cited by examiner

WORK MACHINE

TECHNICAL FIELD

The present invention relates to work machines such as hydraulic excavators.

BACKGROUND ART

In work machines such as hydraulic excavators, a front working device consisting of a boom, arm, and bucket is rotationally driven by hydraulic actuators such as hydraulic cylinders. The driving speed of the hydraulic actuator is controlled to match the target speed set according to the input amount of the operation lever. Generally, from the perspective of operability of the front working device and trajectory control of the bucket, it is desirable for the driving speed to follow the target speed of the front working device without delay. However, the driving speed may vary due to the influence of disturbances such as load on the hydraulic actuator, resulting in a deviation from the target speed. Therefore, a target speed feedback control is Known. the speed feedback control that reduces the variation in driving speed due to disturbances such as load on the hydraulic actuator by adjusting the pump flow so that the driving speed of the hydraulic actuator matches the target speed. (for example, Patent Document 1).

PRIOR ART DOCUMENTS

Patent Literature

Patent Document 1: International Publication No. 2015/025818

SUMMARY OF THE INVENTION

Problem to be Solved by the Invention

However, in the speed feedback control described in Patent Document 1, there is a delay due to filtering processes, etc., when obtaining the driving speed of the hydraulic actuator from the posture sensor. Furthermore, due to the compressibility of the hydraulic fluid, the hydraulic actuator does not start moving until the pump's discharge oil flows into it and the pressure rises, but this pressure response delay cannot be eliminated by speed feedback control. Therefore, there is a limit to improving the followability of the driving speed to the target speed of the hydraulic actuator with only the speed feedback control described in Patent Document 1.

The present invention has been made in view of the above problems, and its purpose is to provide a work machine capable of improving the followability of the driving speed to the target speed of the hydraulic actuator.

Means for Solving the Problem

To achieve the above objectives, the present invention provides a work machine equipped with a vehicle body, a working device mounted on the vehicle body, an actuator that drives the working device, a hydraulic pump, a directional control valve that controls the flow of pressurized oil supplied from the hydraulic pump to the actuator, an operation lever to instruct the operation of the actuator, and a controller that controls the directional control valve according to the input amount of the operation lever. The work machine includes an inertial measurement unit that detects the posture and operating state of the working device, and a pressure sensor that detects the meter-in pressure and meter-out pressure of the actuator. The controller calculates the target speed of the working device according to the input amount of the operation lever, calculates the target flow rate for the actuator, which is the target value of the flow supplied to the actuator based on the target speed, calculates the target discharge flow rate of the hydraulic pump, which is the pump target flow rate based on the actuator target flow rate, calculates the target meter-in pressure, which is the target value of the meter-in pressure based on the input amount of the operation lever, the output value of the inertial measurement unit, and the meter-out pressure, calculates the speed error as the difference between the speed of the working device obtained by the inertial measurement unit and the target speed, calculates the pressure error as the difference between the meter-in pressure and the target meter-in pressure, and corrects the pump target flow rate according to the speed error and the pressure error.

According to the present invention configured as above, the pump target flow rate is corrected so that the difference (speed error) between the driving speed of the working device and the target speed is minimized, and the meter-in pressure of the actuator according to the input amount of the operation lever is obtained, thereby improving the responsiveness of the driving speed to the target speed of the working device.

Advantages of the Invention

According to the work machine of the present invention, it is possible to improve the responsiveness of the driving speed to the target speed of the hydraulic actuator.

MODES FOR CARRYING OUT THE INVENTION

Figure 1:
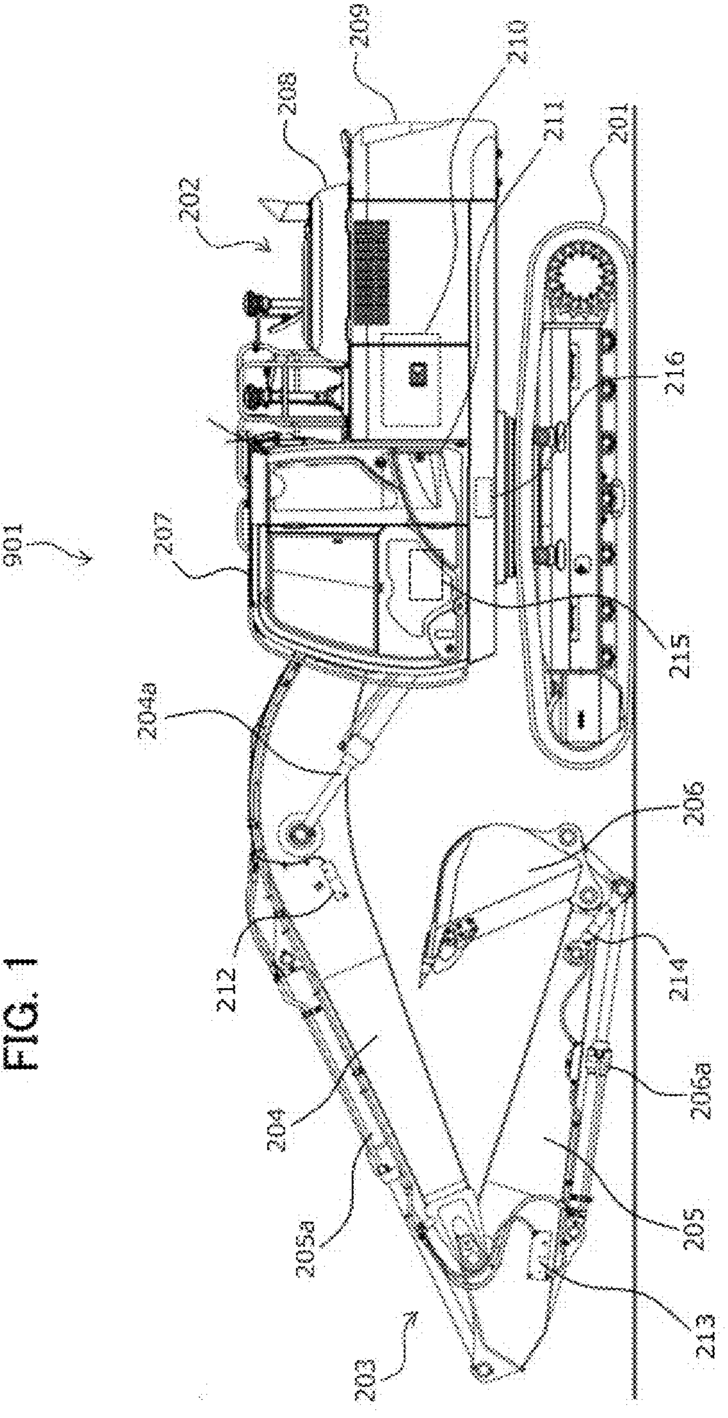
FIG. 1 is a side view of a hydraulic excavator according to an embodiment of the present invention.

FIG. 1 is a side view of a hydraulic excavator according to the present embodiment. The hydraulic excavator 901 includes a traveling body 201, a revolving frame 202 that is rotatably arranged on the traveling body 201 and constitutes the vehicle body, and a working device 203 that is attached to the revolving frame 202 so as to be able to rotate in the vertical direction and performs excavation work of soil and sand, among other tasks. The revolving frame 202 is driven by a revolving motor 211, which is an actuator.

The work device 203 includes a boom 204 that is attached to the swivel body 202 so as to be rotatable in the vertical direction, an arm 205 that is attached to the tip of the boom 204 so as to be rotatable in the vertical direction, a bucket 206 that is attached to the tip of the arm 205 so as to be rotatable in the vertical direction, a boom cylinder 204*a* which is an actuator that drives the boom 204, an arm cylinder 205*a* which is an actuator that drives the arm 205, and a bucket cylinder 206*a* which is an actuator that drives the bucket 206. In the work device 203, inertial measurement devices 212, 213, 214 are installed to detect the posture and operational state of the boom 204, arm 205, and bucket 206. In the swivel body 202, inertial measurement devices 215, 216 are installed to detect the posture of the hydraulic excavator 901 and the rotational speed of the swivel body 202. The inertial measurement devices 212 to 216 are composed of, for example, IMUs.

At the front position on the swivel body 202, a cab 207 is provided, and at the rear position, a counterweight 209 is attached to ensure the weight balance of the vehicle body. Between the cab 207 and the counterweight 209, a machine room 208 is provided. The machine room 208 houses an engine (not shown), hydraulic pump 1 (shown in FIG. 2A), swivel motor 211, control valve 210, etc. The control valve 210 controls the flow of pressurized oil supplied from the hydraulic pump 1 to the actuators 204*a*, 205*a*, 206*a*, 211.

Figure 2A:
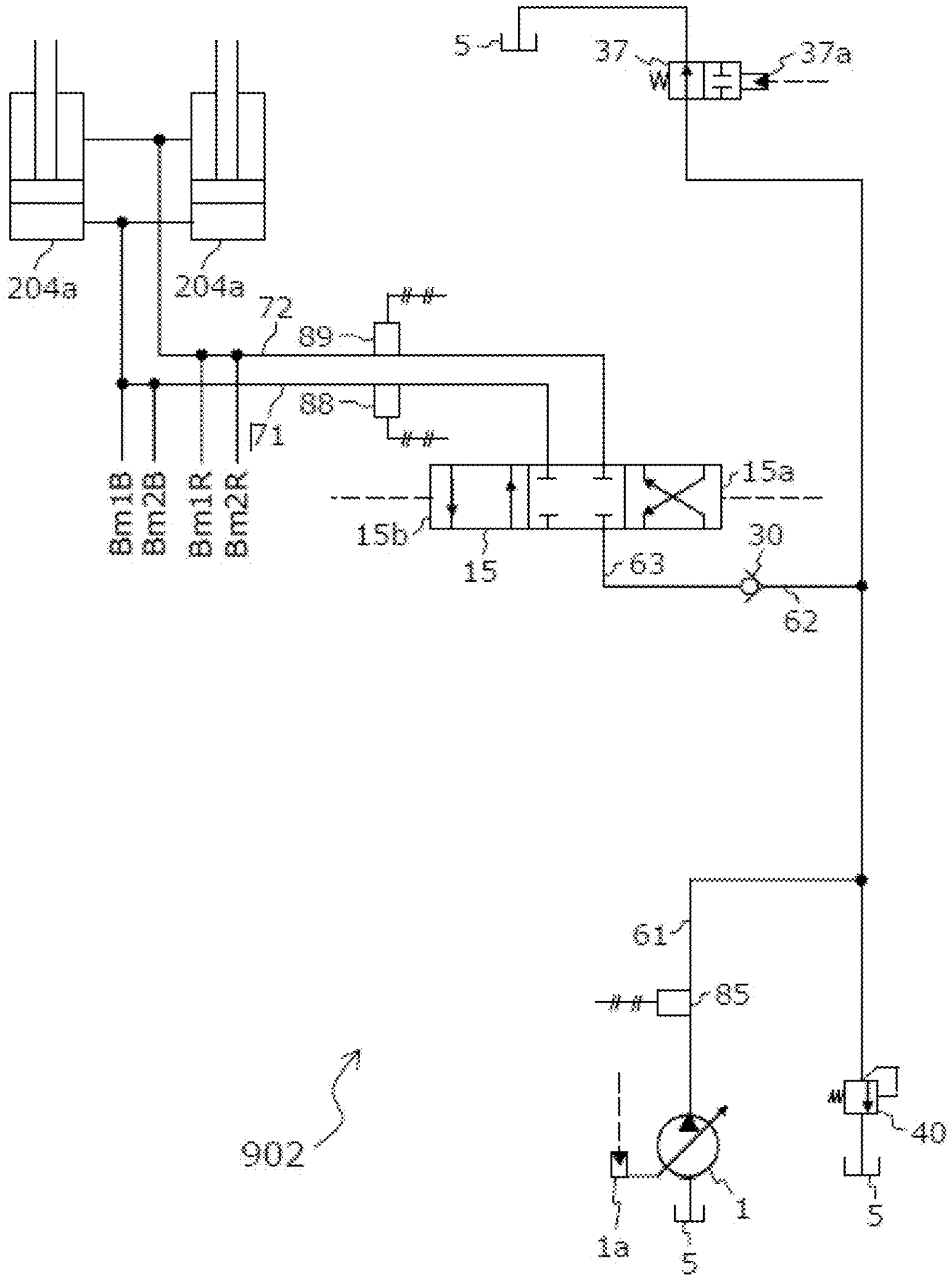
FIG. 2A is a circuit diagram (½) of the hydraulic drive device mounted on the hydraulic excavator shown in FIG. 1.
Figure 2B:
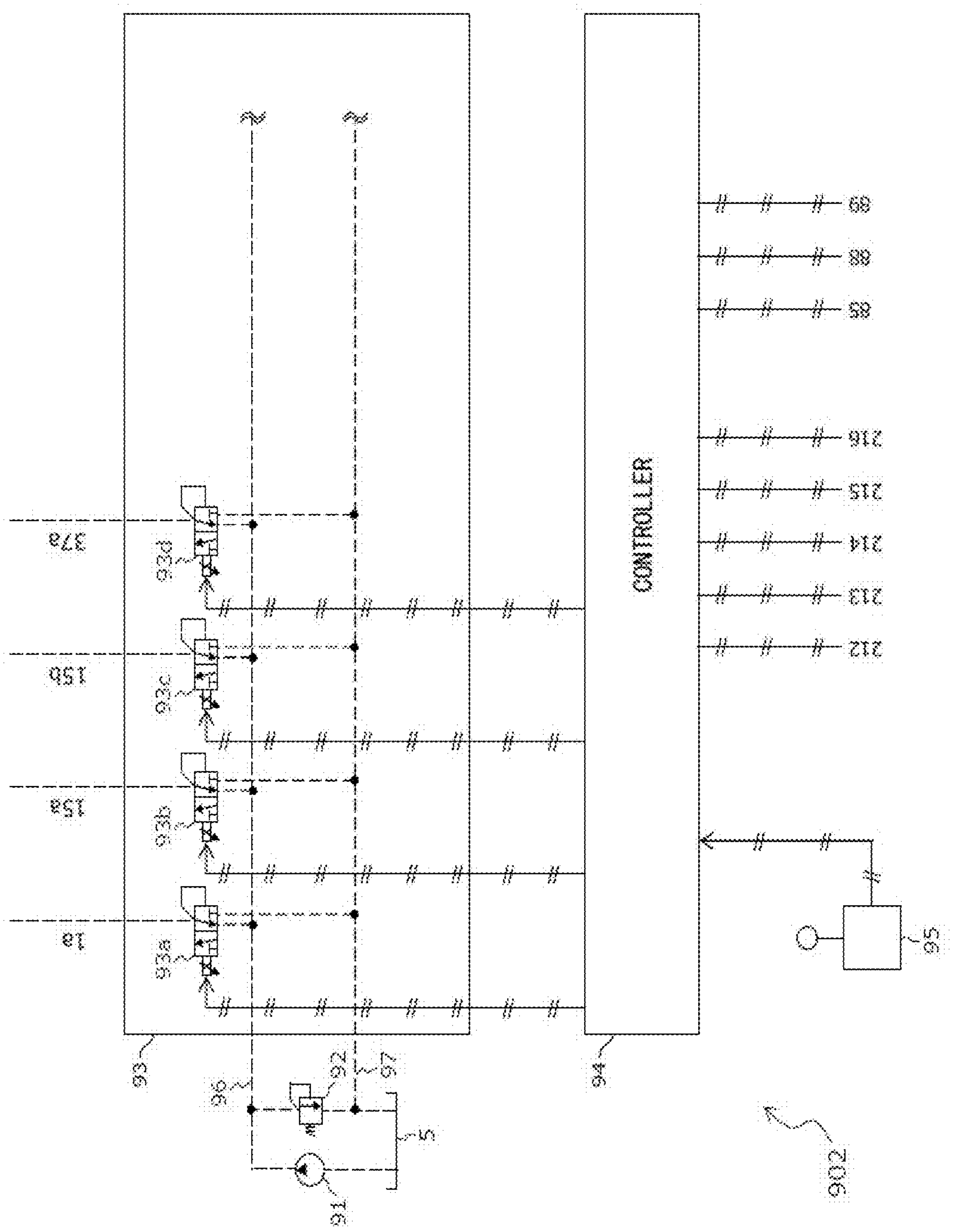
FIG. 2B is a circuit diagram (2/2) of the hydraulic drive device mounted on the hydraulic excavator shown in FIG. 1.

FIGS. 2A and 2B are circuit diagrams of the hydraulic drive device mounted on the hydraulic excavator 901. For simplification, FIGS. 2A and 2B only show the configuration related to the driving of the boom cylinder 204*a*, omitting the configurations related to the driving of other actuators.

(Configuration)

The hydraulic drive device 902 includes a hydraulic pump 1 consisting of a variable displacement hydraulic pump, a pilot pump 91, and a hydraulic oil tank 5 that supplies oil to the hydraulic pump 1 and pilot pump 91. The hydraulic pump 1 and pilot pump 91 are driven by an engine (not shown). The tilt angle of the hydraulic pump 1 is controlled by a regulator attached to the hydraulic pump 1. The regulator of the hydraulic pump 1 has a flow control command pressure port 1*a* and is driven by the command pressure acting on the flow control command pressure port 1*a*.

In the pump passage 61 supplied with the discharge oil from the hydraulic pump 1, a boom direction control valve 15 and several other direction control valves not shown are connected in parallel via meter-in passages 62, 63, and several other meter-in passages not shown. The boom direction control valve 15 is driven by the command pressure acting on pilot ports 15*a*, 15*b*, and controls the flow of pressurized oil supplied from the hydraulic pump 1 to the boom cylinder 204*a*.

Check valves 30 are placed in the meter-in passages 62, 63 to prevent backflow from the boom cylinder 204*a* to the pump passage 61. The pump passage 61 is connected to the hydraulic oil tank 5 via a main relief valve 40 to protect the circuit from excessive pressure rise. The pump passage 61 is connected to the hydraulic oil tank 5 via a bleed-off valve 37 to allow the discharge of excess oil from the hydraulic pump 1.

In the pump passage 61, a pressure sensor 85 is provided to detect the discharge pressure (pump pressure) of the hydraulic pump 1. In the passage 71 connecting the boom direction control valve 15 and the bottom side of the boom cylinder 204*a*, a pressure sensor 88 is provided to detect the boom bottom pressure. In the passage 72 connecting the boom direction control valve 15 and the rod side of the boom cylinder 204*a*, a pressure sensor 89 is provided to detect the boom rod pressure.

The discharge port of the pilot pump 91 is connected to the hydraulic oil tank 5 via a pilot relief valve 92 for generating pilot primary pressure, and through passage 96, to one input port of the solenoid valves 93*a* to 93*d* built into the solenoid valve unit 93. The other input ports of solenoid valves 93*a* to 93*d* are connected to the hydraulic oil tank 5 through passage 97. Each of the solenoid valves 93*a* to 93*d* reduces the pilot primary pressure in accordance with command signals from the controller 94 and outputs it as command pressure.

The output port of solenoid valve 93*a* is connected to the flow control command pressure port 1*a* of the regulator of hydraulic pump 1. The output ports of solenoid valves 93*b*, 93*c* are connected to the pilot ports 15*a*, 15*b* of the boom direction control valve 15. The output port of solenoid valve 93*d* is connected to the command pressure port 37*a* of the bleed-off valve 37.

The hydraulic drive device 902 includes a controller 94 and an operation lever 95 capable of switching the boom direction control valve 15. The controller 94 outputs command signals to the solenoid valves 93*a* to 93*d* based on the input amount of the operation lever 95, the output values of the inertial measurement devices 212 to 216, and the output values of the pressure sensors 85, 88, 89.

Figure 3:
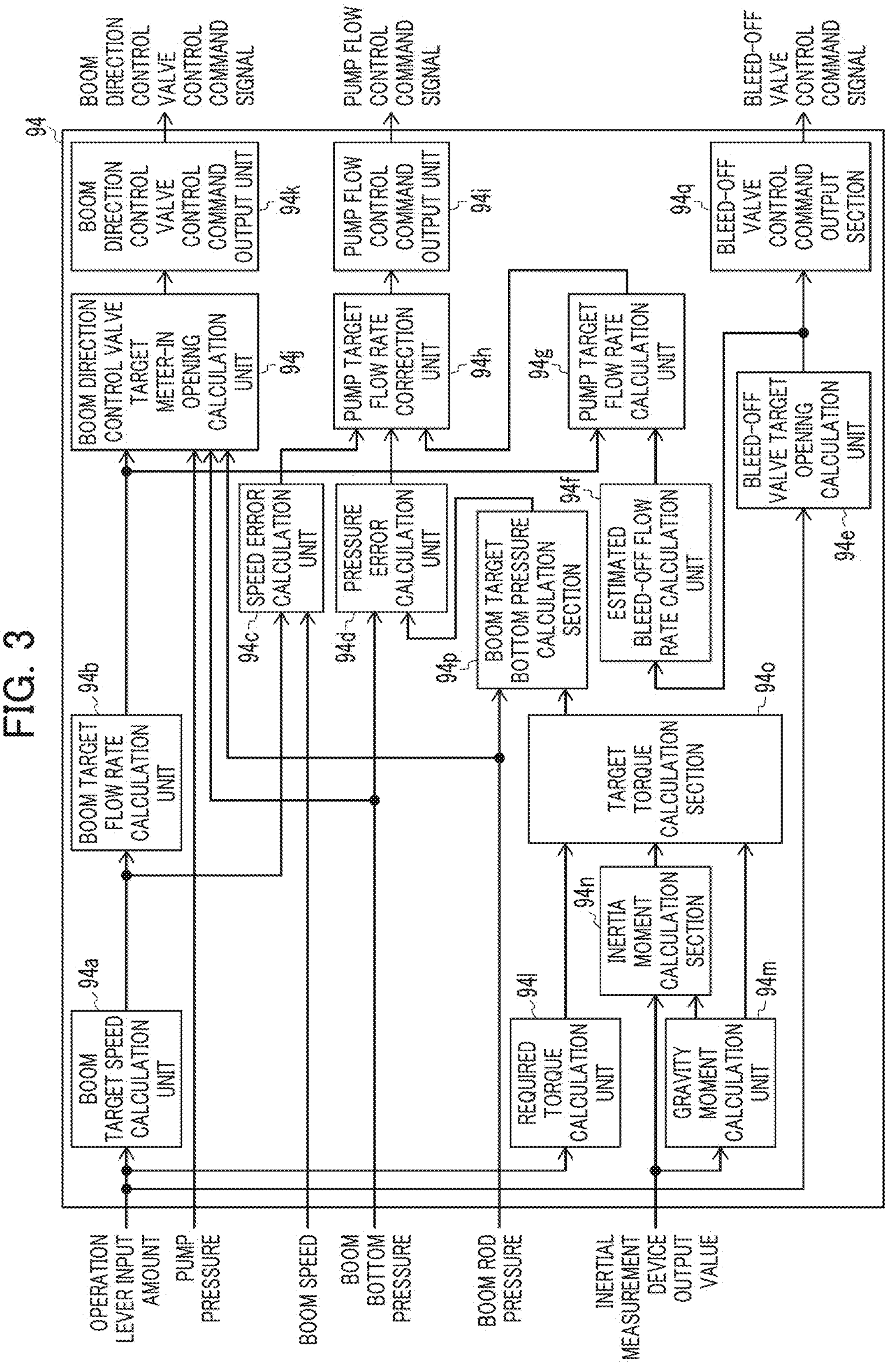
FIG. 3 is a functional block diagram of the controller shown in FIG. 2B.

FIG. 3 is a functional block diagram of the controller 94. The controller 94 has a boom target speed calculation unit 94*a*, a boom target flow rate calculation unit 94*b*, a speed error calculation unit 94*c*, a pressure error calculation unit 94*d*, a bleed-off valve target opening calculation unit 94*e*, an estimated bleed-off flow rate calculation unit 94*f*, a pump target flow rate calculation unit 94*g*, a pump target flow rate correction unit 94*h*, a pump flow control command output unit 94*i*, a boom direction control valve target meter-in opening calculation unit 94*j*, a boom direction control valve control command output unit 94*k*, a required torque calculation unit 94*l*, a gravity moment calculation unit 94*m*, an inertia moment calculation unit 94*n*, a target torque calculation unit 940, a boom target bottom pressure calculation unit 94*p*, and a bleed-off valve control command output unit 94*q*.

The boom target speed calculation unit 94*a* calculates the boom target speed VTgtBm according to the input amount of the operation lever, following the predetermined boom target speed characteristics relative to the operation lever input amount. The boom target flow rate calculation unit 94*b* calculates the target value of the flow rate (boom target flow rate QTgtBm) to be supplied to the boom cylinder 204*a*, based on the boom target speed VTgtBm calculated by the boom target speed calculation unit 94*a*. The boom direction control valve target meter-in opening calculation unit 94*j* calculates the target value of the meter-in opening (boom direction control valve target meter-in opening ATgtBm) of the boom direction control valve 15, based on the boom target flow rate QTgtBm calculated by the boom target flow rate calculation unit 94*b* and the differential pressure ΔP before and after the boom direction control valve 15 obtained by the pressure sensors 85, 88, 89. The boom direction control valve control command output section 94*k* outputs a command signal (boom direction control valve control command signal) to solenoid valves 93*b*, 93*c* according to the solenoid valve command signal characteristics for the preset boom 6 direction control valve target metering opening ATgtBm, based on the target metering opening ATgtBm.

The speed error calculation section 94*c* calculates the speed error as the difference between the boom target speed VTgtBm calculated by the boom target speed calculation section 94*a* and the driving speed of boom 204 obtained by the inertial measurement devices 212 to 216. The requested torque calculation section 94*l* calculates the boom requested torque TReqBm according to the boom requested torque characteristics for a preset operation lever input amount, based on the operation lever input amount. The gravity moment calculation section 94*m* calculates the gravity component of the boom moment as the gravity moment TGravity, based on the output values of the inertial measurement devices 212 to 216 and the vehicle specification values. The inertia moment calculation section 94*n* calculates the inertia component of the boom moment as the inertia moment TInertia, based on the gravity moment TGravity calculated by the gravity moment calculation section 94*m* and the output values of the inertial measurement devices 212 to 216. The target torque calculation section 940 calculates the target torque TTgtBm for boom 204 based on the requested torque calculated by the requested torque calculation section 94*l*, the gravity moment TGravity calculated by the gravity moment calculation section 94*m*, and the inertia moment TInertia calculated by the inertia moment calculation section 94*n*. The pressure error calculation section 94*d* calculates the pressure error EP as the difference between the boom target bottom pressure calculated by the boom target bottom pressure calculation section 94*p* and the boom bottom pressure obtained by the pressure sensor 88.

The bleed-off valve target opening calculation section 94*e* calculates the target opening of the bleed-off valve according to the bleed-off valve target opening characteristics for a preset operation lever input amount, based on the operation lever input amount. The estimated bleed-off flow rate calculation section 94*f* calculates the estimated bleed-off flow rate QEstBO based on the target opening of the bleed-off valve calculated by the bleed-off valve target opening calculation section 94*e*. The pump target flow rate calculation section 94*g* calculates the pump target flow rate QTgtPmp based on the boom target flow rate QTgtBm calculated by the boom target flow rate calculation section 94*b* and the estimated bleed-off flow rate QEstBO calculated by the estimated bleed-off flow rate calculation section 94*f*. The pump target flow rate correction section 974*h* corrects the pump target flow rate QTgtPmp calculated by the pump target flow rate calculation section 94*g* according to the speed error ES calculated by the speed error calculation section 94*c* and the pressure error EP calculated by the pressure error calculation section 94*d*. The pump flow control command output section 94*i* outputs a command signal (pump flow control command signal) to solenoid valve 93*a* according to the solenoid valve command signal characteristics for the preset pump target flow rate QTgtPmp, based on the pump target flow rate corrected by the pump target flow rate correction section 94*h*.

The bleed-off valve control command output section 94*q* outputs a command signal (bleed-off valve control command signal) to solenoid valve 93*d* according to the solenoid valve command signal characteristics for the preset bleed-off valve target opening, based on the target opening of the bleed-off valve calculated by the bleed-off valve target opening calculation section 94*e*.

Figure 4:
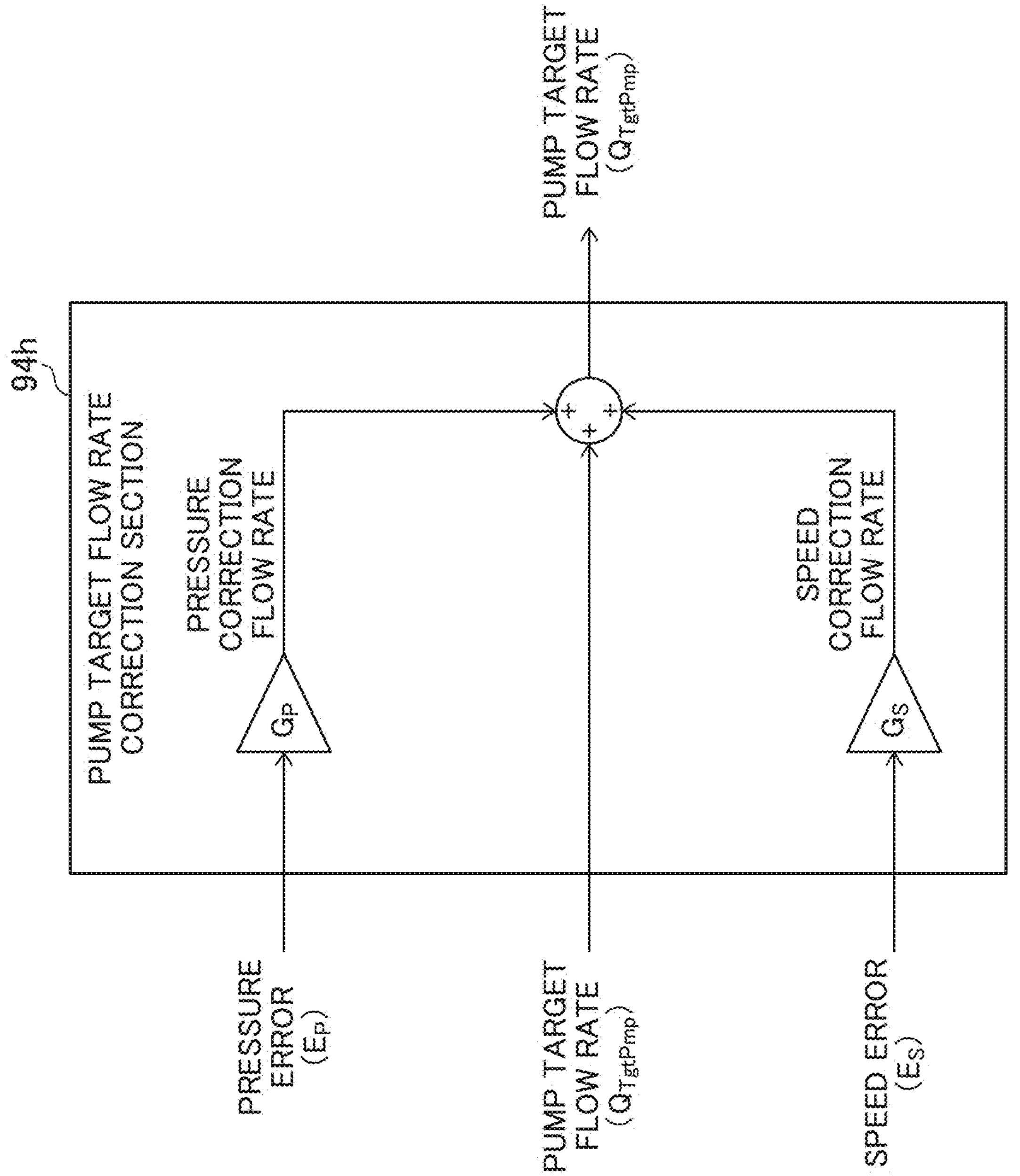
FIG. 4 is a calculation block diagram of the pump target flow rate correction unit shown in FIG. 3.

FIG. 4 is an operational block diagram of the pump target flow rate correction section 94*h*. The pump target flow rate correction unit 94*h* corrects the pump target flow rate QTgtPmp calculated by the pump target flow rate calculation unit 94*g* by adding the value obtained by multiplying the pressure error EP by the pressure feedback gain GP (pressure correction flow rate) and the value obtained by multiplying the speed error ES by the speed feedback gain GS (speed correction flow rate). In this embodiment, while the speed feedback gain GS is a constant value, the pressure feedback gain GP changes according to the speed error ES.

Figure 5:
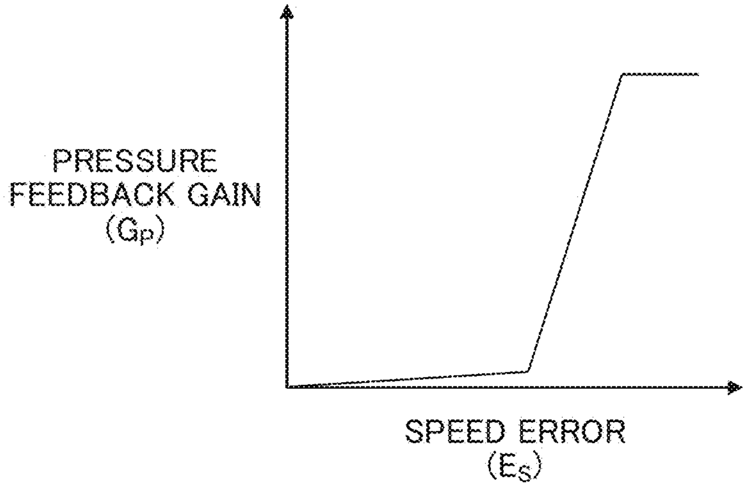
FIG. 5 is a diagram showing the characteristics of the pressure feedback gain shown in FIG. 4.

FIG. 5 is a diagram showing the characteristics of the pressure feedback gain GP. When the speed error ES is small, it is possible to ensure the pump flow rate followability with only speed feedback control. On the other hand, when the speed error ES is large, it is not possible to ensure the pump flow rate followability with only speed feedback control. Therefore, in this embodiment, the pressure feedback gain GP is set to increase according to the speed error ES. As a result, as the speed error ES increases, the sensitivity of the pressure feedback control to the pump flow rate increases, making it possible to ensure the pump flow rate followability regardless of the magnitude of the speed error ES.

Figure 6:
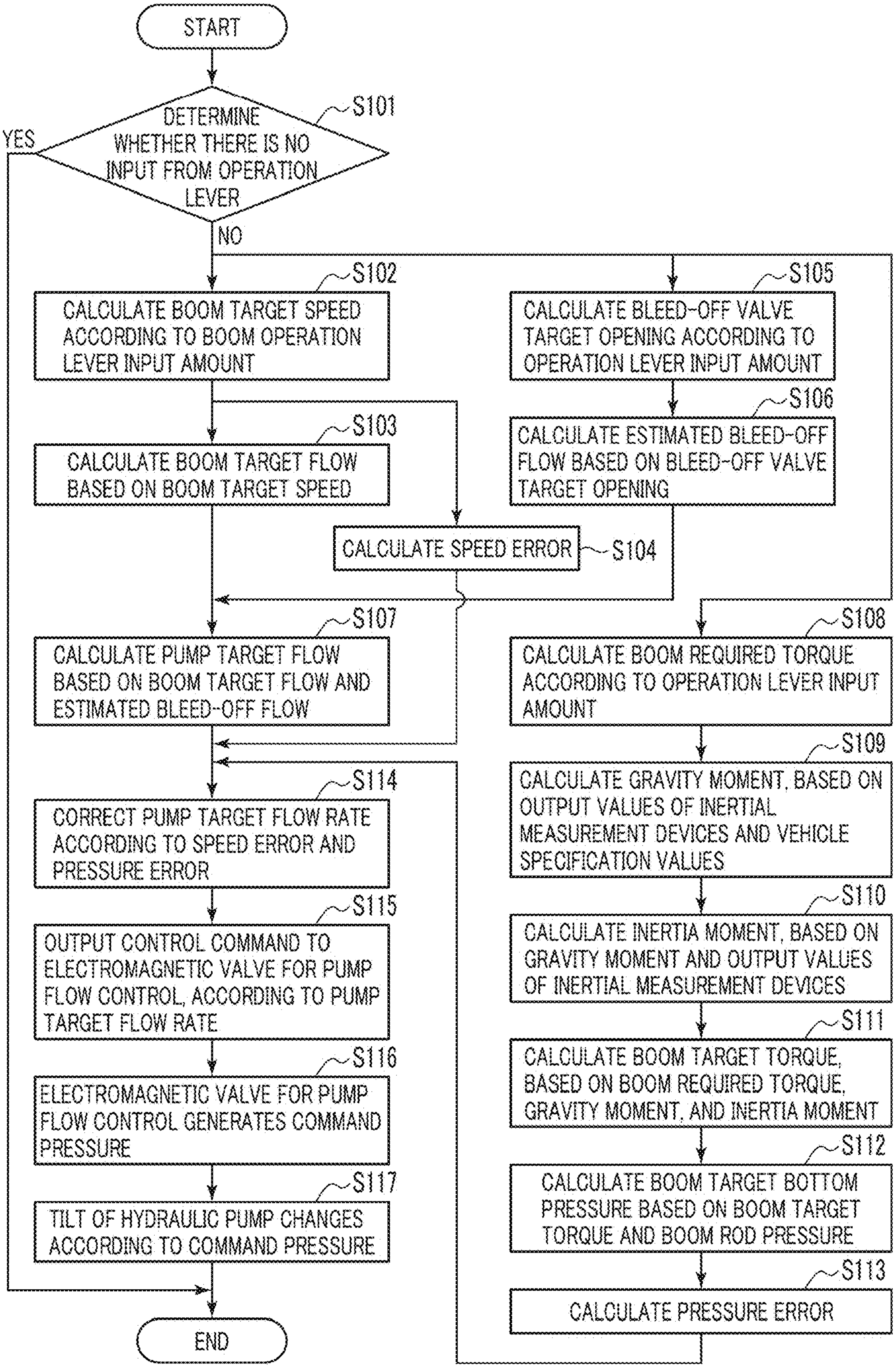
FIG. 6 is a flowchart showing the process related to pump flow control of the controller shown in FIG. 2B.

FIG. 6 is a flowchart showing the process related to pump flow control of controller 94.

First, controller 94 determines whether there is no input from the operation lever (step S101). If it is determined that there is no operation lever input (YES) at step S101, the flow is terminated.

If it is determined that there is an operation lever input (NO) at step S101, the boom target speed calculation unit 94*a* calculates the boom target speed VTgtBm according to the boom operation lever input amount, following the predetermined boom target speed characteristics for the operation lever input amount (step S102).

Following step S102, the boom target flow calculation unit 94*b* calculates the boom target flow QTgtBm based on the boom target speed VIgtBm calculated by the boom target speed calculation unit 94*a* (step S103). In parallel with step S103, the speed error calculation unit 94*c* calculates the speed error ES as the difference between the boom target speed VTgtBm calculated by the boom target speed calculation unit 94*a* and the driving speed of boom 204 obtained by the inertial measurement devices 212 to 216 (step S104).

In parallel with step S102, the bleed-off valve target opening calculation unit 94*e* calculates the bleed-off valve target opening ATgtBO according to the operation lever input amount (step S105).

Following step S105, the estimated bleed-off flow calculation unit 94*f* calculates the estimated bleed-off flow QEstBO based on the bleed-off valve target opening ATgtBO (step S106).

Following steps S103 and S106, the pump target flow calculation unit 94*g* calculates the pump target flow QTgtPmp based on the boom target flow QTgtBm calculated by the boom target flow calculation unit 94*b* and the estimated bleed-off flow QEstBO calculated by the estimated bleed-off flow calculation unit 94*f* (step S107).

In parallel with step S102, the required torque calculation unit 94*l* calculates the boom required torque TReqBm according to the operation lever input amount, following the predetermined boom required torque characteristics for the operation lever input amount (step S108).

Following step S108, the gravity moment calculation unit 94_m_ calculates the gravity component of the boom moment as the gravity moment MGravity, based on the output values of the inertial measurement devices 212 to 216 and the vehicle specification values (mainly dimensions of the structure) (step S109).

Following step S109, the inertia moment calculation unit 94_n_ calculates the inertia component of the boom moment as the inertia moment MInertia, based on the gravity moment MGravity calculated by the gravity moment calculation unit 94_m_ and the output values of the inertial measurement devices 212 to 216 (step S110).

Following step S110, the target torque calculation unit 940 calculates the boom target torque TTgtBm using formula [1], based on the boom required torque TReqBm calculated by the required torque calculation unit 94_l_, the gravity moment MGravity calculated by the gravity moment calculation unit 94_m_, and the inertia moment MInertia calculated by the inertia moment calculation unit 94_n_ (step S111). Here, the torque in the same rotation direction as the boom required torque TReqBm is considered positive.

$$T_{TgtBm} = T_{ReqBm} - M_{Gravity} - M_{Inertia} \quad \text{[Formula 1]}$$

Following step S111, the boom target bottom pressure calculation unit 94_p_ calculates the boom target bottom pressure based on the boom target torque TTgtBm calculated by the target torque calculation unit 940 and the boom rod pressure obtained by the pressure sensor 89 (step S112).

Following step S112, the pressure error calculation unit 94_d_ calculates the pressure error EP as the difference between the boom target bottom pressure calculated by the boom target bottom pressure calculation unit 94_p_ and the boom bottom pressure obtained by the pressure sensor 88 (step S113).

Following steps S104, S107, S113, the pump target flow rate correction unit 94_h_ corrects the pump target flow rate QTgtPmp according to the speed error ES calculated by the speed error calculation unit 94_c_ and the pressure error EP calculated by the pressure error calculation unit 94_d_ (step S114).

Following step S114, the pump flow control command output unit 94_i_ outputs a control command (pump flow control command) to the electromagnetic valve 93_a_ for pump flow control, according to the pump target flow rate QTgtPmp calculated by the pump target flow rate correction unit 94_h_, following the preset electromagnetic valve command signal characteristics for the pump target flow rate QTgtPmp (step S115).

Following step S115, the electromagnetic valve 93_a_ for pump flow control generates a command pressure (step S116), changes the tilt of the hydraulic pump 1 according to the command pressure (step S117), and then ends the flow.

Figure 7:
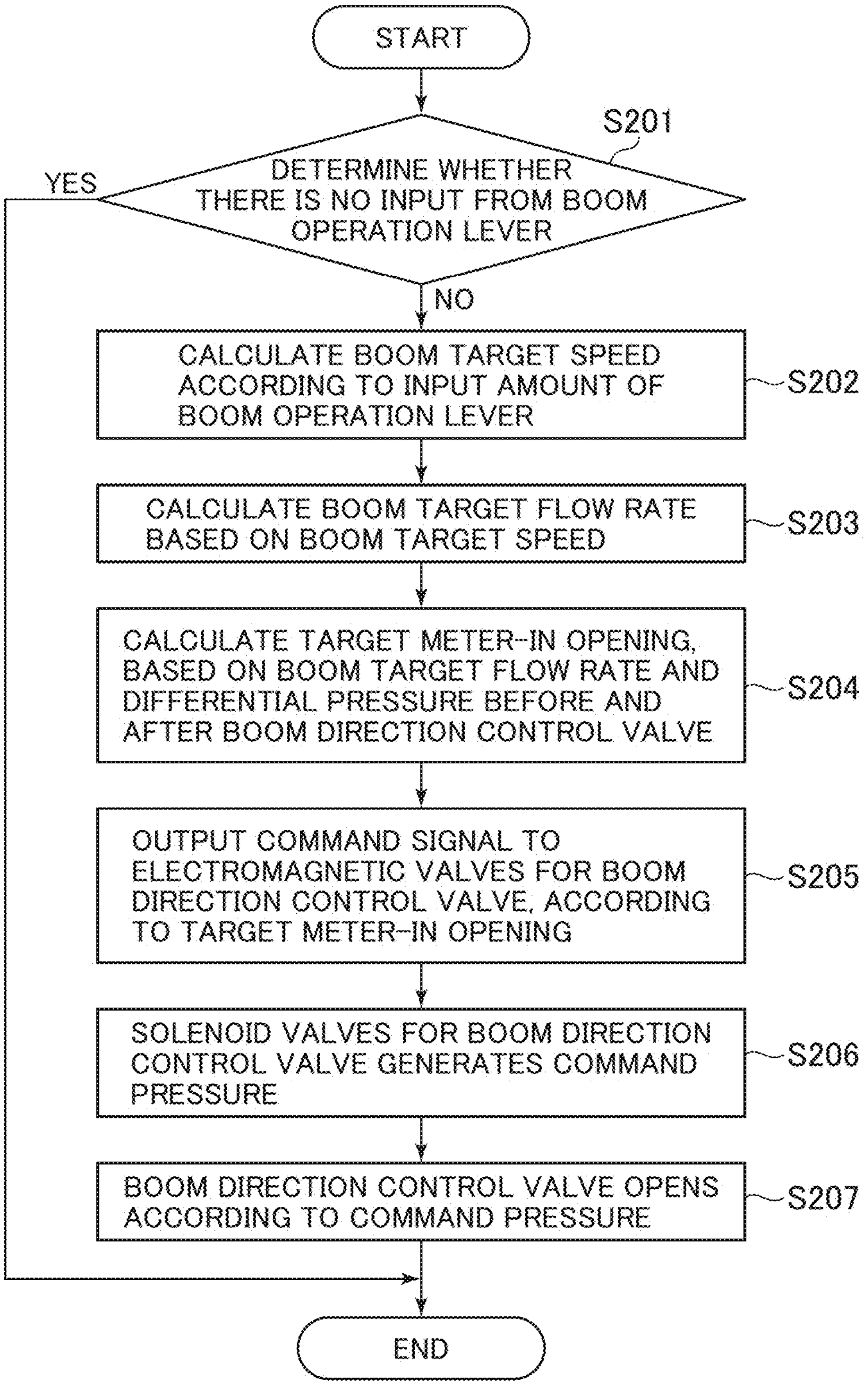
FIG. 7 is a flowchart showing the process related to boom directional control valve opening control of the controller shown in FIG. 2B.

FIG. 7 is a flowchart showing the process related to the boom direction control valve opening control of the controller 94.

First, the controller 94 determines whether there is no input from the boom operation lever (step S201). If it is determined that there is no input from the boom operation lever at step S201 (YES), the flow ends.

If it is determined that there is input from the boom operation lever at step S201 (NO), the boom target speed calculation unit 94_a_ calculates the boom target speed VTgtBm according to the input amount of the boom operation lever, following the preset boom target speed characteristics for the input amount of the boom operation lever (step S202).

Following step S202, the boom target flow rate calculation unit 94_b_ calculates the boom target flow rate QTgtBm based on the boom target speed VTgtBm calculated by the boom target speed calculation unit 94_a_ (step S203).

Following step S203, the boom direction control valve target meter-in opening calculation unit 94_j_ calculates the target meter-in opening ATgtBm of the boom direction control valve 15 using formula [2], based on the boom target flow rate QTgtBm calculated by the boom target flow rate calculation unit 94_b_ and the differential pressure ΔP before and after the boom direction control valve 15 obtained from the output values of pressure sensors 85, 88, 89 (step S204).

$$A_{TgtBm} = Q_{TgtBm} / \left(Cd \times \sqrt{(2 \times \Delta P / \rho)}\right) \quad \text{[Formula 2]}$$

Here, Cd is the flow coefficient, and p is the density of the hydraulic oil.

Following step S204, the boom direction control valve control command output unit 94_k_ outputs a command signal (boom direction control valve control command signal) to the electromagnetic valves 93_b_, 93_c_ for the boom direction control valve 15, according to the target meter-in opening ATgtBm calculated by the boom direction control valve target meter-in opening calculation unit 94_j_, following the preset electromagnetic valve command signal characteristics for the target meter-in opening of the boom direction control valve 15 (step S205).

Following step S205, solenoid valves 93_b_, 93_c_ for the boom direction control valve 15 generate a command pressure (step S206), open the boom direction control valve 15 according to the command pressure (step S207), and then end the flow.

Figure 8:
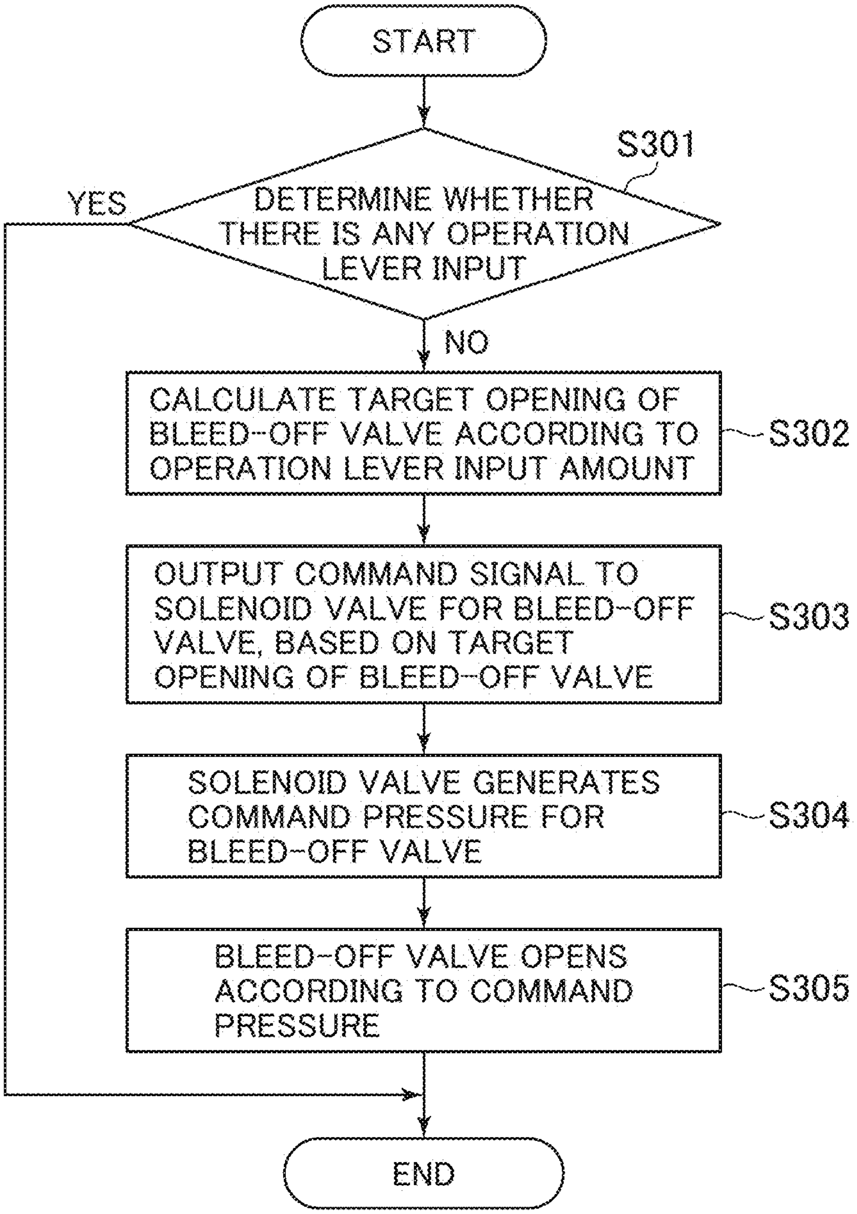
FIG. 8 is a flowchart showing the process related to bleed-off valve opening control of the controller shown in FIG. 2B.

FIG. 8 is a flowchart showing the process related to bleed-off valve opening control by controller 94.

First, controller 94 determines whether there is any operation lever input (step S301). The operation lever input mentioned here corresponds to any of the multiple actuators (boom cylinder 204_a_ and other actuators not shown) connected to the pump passage 61 of hydraulic pump 1. If it is determined that there is no operation lever input (YES) at step S301, the flow ends.

Figure 9:
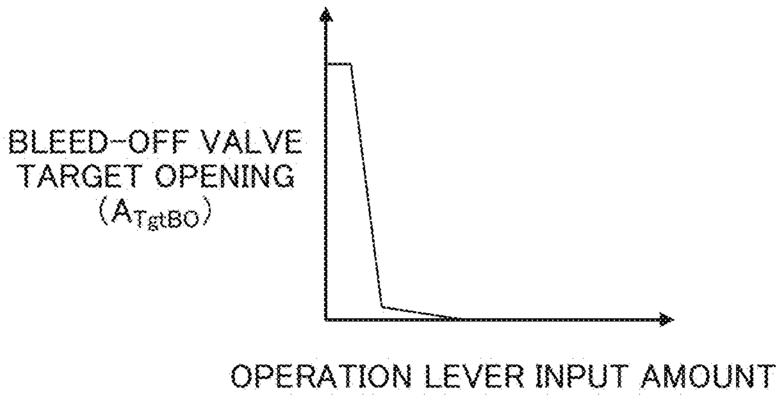
FIG. 9 is a diagram showing the target opening characteristics of the bleed-off valve shown in FIG. 2A.

If it is determined that there is an operation lever input (NO) at step S301, the bleed-off valve target opening calculation unit 94_e_ calculates the target opening ATgtBO of bleed-off valve 37 according to the operation lever input amount, following the bleed-off valve target opening characteristics shown in FIG. 9 (step S302). In FIG. 9, the target opening of the bleed-off valve is at its maximum when the operation lever input amount is near zero, and it decreases sharply to zero once the input amount exceeds a certain value. Here, the operation lever input amount refers to the maximum value of the operation lever inputs corresponding to the multiple actuators (boom cylinder 204_a_ and other actuators not shown) connected to the pump passage 61 to which bleed-off valve 37 is connected.

Returning to FIG. 8, following step S302, the bleed-off valve control command output unit 94_q_ outputs a command signal (bleed-off valve control command signal) to the solenoid valve 93_d_ for bleed-off valve 37, according to the predetermined electromagnetic valve command signal characteristics for the target opening of bleed-off valve 37, based on the target opening ATgtBO of bleed-off valve 37 (step S303).

Following step S303, solenoid valve 93*d* generates a command pressure for bleed-off valve 37 (step S304), opens bleed-off valve 37 according to the command pressure (step S305), and then ends the flow.

(Operation)

As an example of the operation of hydraulic drive device 902, the operation of hydraulic pump 1, boom direction control valve 15, and bleed-off valve 37 when boom operation lever 95 is operated is described.

'Hydraulic Pump'

Controller 94 calculates the boom target speed VTgtBm based on the input amount of boom operation lever 95, calculates the pump target flow rate QTgtPmp based on the boom target speed VTgtBm and the estimated bleed-off flow rate QEstBO, corrects the pump target flow rate QTgtPmp according to the speed error ES and pressure error EP, and outputs a command signal (pump flow control command signal) to solenoid valve 93*a* according to the corrected pump target flow rate QTgtPmp. Solenoid valve 93*a* generates a command pressure according to the pump flow control command signal and controls the discharge flow rate of hydraulic pump 1.

'Boom Direction Control Valve'

Controller 94 calculates the boom target speed VTgtBm based on the input amount of the boom operation lever 95, calculates the boom target flow rate QTgtBm based on the boom target speed VTgtBm, calculates the target meter-in opening ATgtBm based on the boom target flow rate QTgtBm and the differential pressure ΔP before and after the boom direction control valve 15, and outputs a command signal (boom direction control valve control command signal) corresponding to the target meter-in opening ATgtBm to solenoid valves 93*b*, 93*c*. Solenoid valves 93*b*, 93*c* generate a command pressure according to the boom direction control valve control command signal and control the meter-in opening of the boom direction control valve 15.

'Bleed-Off Valve'

Controller 94 calculates the target opening ATgtBO of the bleed-off valve 37 based on the input amount of the boom operation lever 95, and outputs a command signal (bleed-off valve control command signal) corresponding to the target opening ATgtBO to solenoid valve 93*d*. Solenoid valve 93*d* generates a command pressure according to the bleed-off valve control command signal and controls the opening of the bleed-off valve 37.

Figure 10:
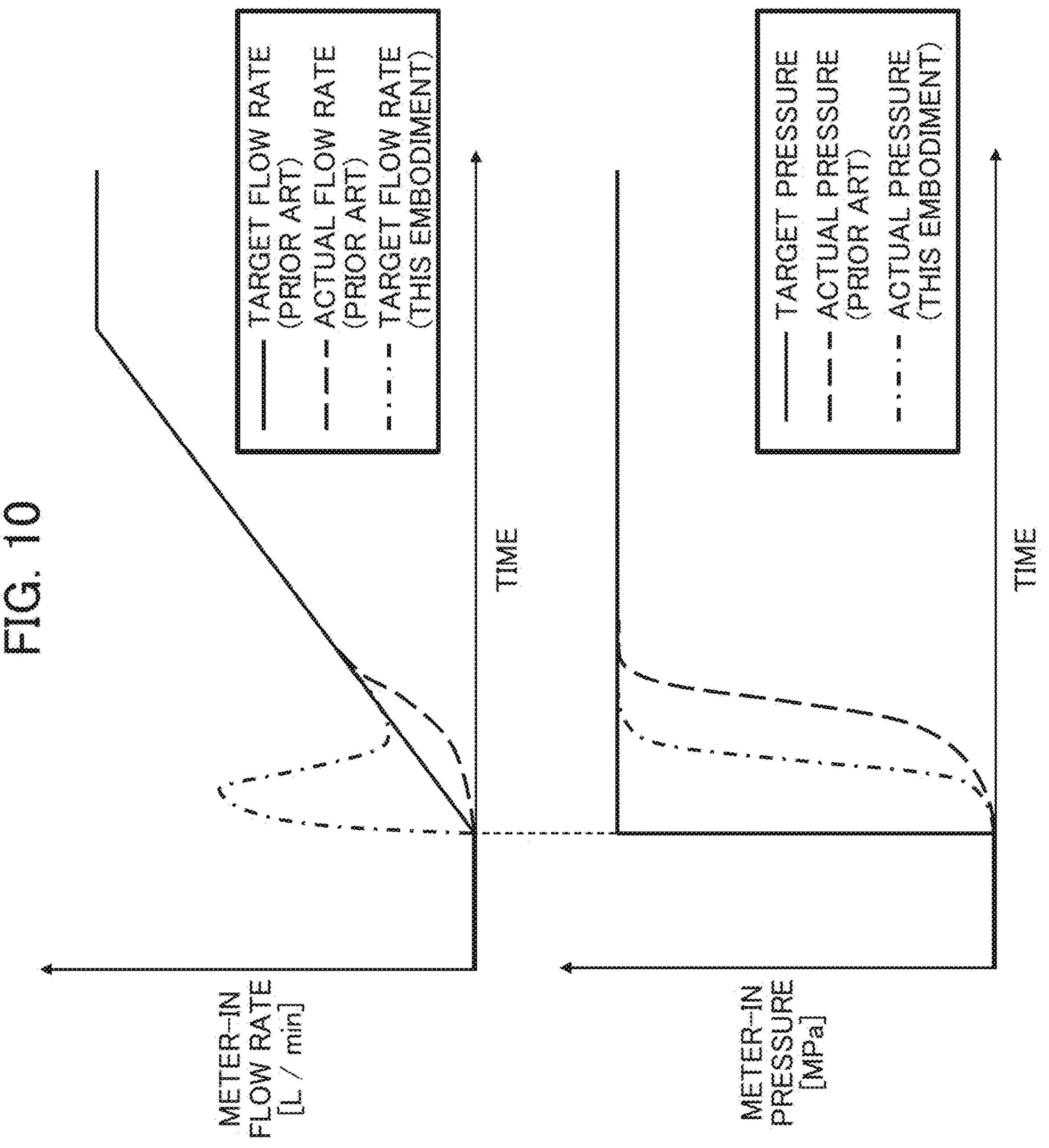
FIG. 10 is a diagram showing the time series changes in the flow and meter-in pressure of the boom cylinder when the boom operation lever is operated.

FIG. 10 is a diagram showing the time series changes in the meter-in flow rate and meter-in pressure of the boom cylinder 204*a* when the boom operation lever 95 is operated.

In the prior art, when the operation of the boom cylinder 204*a* begins, as shown by the solid line in the figure, the target value of the meter-in flow rate (target flow rate) increases according to the input amount of the operation lever, and the target value of the meter-in pressure (target pressure) becomes a value according to the rate of increase in the operation lever input amount. In the prior art, because the flow rate supplied to the hydraulic actuator is controlled as the target flow rate, as shown by the dashed line in the figure, if the rise in the meter-in pressure of the hydraulic actuator at the start of movement is slow due to the effect of inertia, the flow rate (actual flow rate) supplied to the hydraulic actuator cannot follow the target flow rate.

In contrast, in this embodiment, in addition to speed feedback control, pressure feedback control is executed to make the meter-in pressure (boom bottom pressure) of the boom cylinder 204*a* follow the target meter-in pressure (boom target bottom pressure). Therefore, at the start of movement of the boom 204, when the difference between the meter-in pressure of the boom cylinder 204*a* and the target meter-in pressure increases, the target flow rate is significantly corrected to the increase side as shown by the dotted line in the figure, and the rise in the meter-in pressure (actual pressure) of the boom cylinder 204*a* is accelerated. As a result, the flow rate (actual flow rate) supplied to the boom cylinder 204*a* accurately follows the target flow rate, and the difference between the target speed and the driving speed of the boom 204 becomes smaller. It should be noted that although the case where the boom cylinder 204*a* is driven has been described as an example, the same applies when other hydraulic actuators are driven.

(Summary)

In this embodiment, a vehicle body 202, a working device 203 attached to the vehicle body 202, an actuator 204*a* that drives the working device 203 (boom 204), a hydraulic pump 1, a directional control valve 15 that controls the flow of pressurized oil supplied from the hydraulic pump 1 to the actuator 204*a*, an operation lever 95 for instructing the operation of the actuator 204*a*, and a controller 94 that controls the directional control valve 15 according to the input amount of the operation lever 95 are provided in the work machine 901, which includes an inertial measurement device 212-216 for detecting the posture and operating state of the working device 203 (boom 204), and pressure sensors 88, 89 for detecting the meter-in pressure and meter-out pressure of the actuator 204*a*, the controller 94 calculates the target speed VTgtBm of the working device 203 (boom 204) according to the input amount of the operation lever 95, calculates the target flow rate QTgtBm of the actuator, which is the target value of the flow rate supplied to the actuator 204*a* based on the target speed VTgtBm, calculates the target discharge flow rate QTgtPmp of the hydraulic pump 1 based on the actuator target flow rate QTgtBm, calculates the target meter-in pressure (boom target bottom pressure), which is the target value of the meter-in pressure (boom bottom pressure), based on the input amount of the operation lever 95, the output value of the inertial measurement device 212-216, and the meter-out pressure (boom rod pressure), calculates the speed error ES as the difference between the driving speed of the working device 203 (boom 204) obtained by the inertial measurement device 212-216 and the target speed VTgtBm, calculates the pressure error EP as the difference between the meter-in pressure (boom bottom pressure) obtained by the pressure sensor 88 and the target meter-in pressure (boom target bottom pressure), and corrects the pump target flow rate QTgtPmp according to the speed error ES and the pressure error EP.

According to the embodiment configured as described above, the pump target flow rate QTgtPmp is corrected so that the difference (speed error) between the driving speed of the working device 203 (boom 204) and the target speed VTgtBm is minimized, and the meter-in pressure of the actuator 204*a* according to the input amount of the operation lever 95 is obtained, thereby improving the followability of the driving speed to the target speed VTgtBm of the working device 203 (boom 204). As a result, the construction accuracy of the work machine 901 is improved.

In this embodiment, the controller 94 calculates the speed correction flow rate by multiplying the speed error ES by the speed feedback gain GS, calculates the pressure correction flow rate by multiplying the pressure error EP by the pressure feedback gain GP, and corrects the pump target flow rate QTgtPmp by adding the speed correction flow rate and the pressure correction flow rate to the pump target flow rate QTgtPmp. This allows the sensitivity of speed feedback control and pressure feedback control to the pump flow rate to be adjusted by the speed feedback gain GS and the pressure feedback gain GP.

In this embodiment, the pressure feedback gain GP is set to increase as the speed error ES increases. This ensures that as the speed error ES increases, the sensitivity of pressure feedback control to the pump flow rate becomes higher, making it possible to ensure the followability of the pump flow rate regardless of the magnitude of the speed error ES.

Thus, the embodiments of the present invention have been described in detail, but the present invention is not limited to the described embodiments and includes various modifications. For example, the described embodiments have been explained in detail to make the invention easier to understand, and are not necessarily limited to having all the configurations described.

DESCRIPTION OF REFERENCE CHARACTERS

1: Hydraulic pump
1*a*: Flow control command pressure port
5: Hydraulic oil tank
15: Boom direction control valve
15*a*, 15*b*: Pilot ports
30: Check valve
37: Bleed-off valve
37*a*: Command pressure port
40: Main relief valve
61: Pump passage
62, 63: Meter-in passage
71, 72: Passage
85, 88, 89: Pressure sensors
91: Pilot pump
92: Pilot relief valve
93: Solenoid valve unit
93*a* to 93*d*: Solenoid valves
94: Controller
94*a*: Boom target speed calculation unit
94*b*: Boom target flow rate calculation unit
94*c*: Speed error calculation unit
94*d*: Pressure error calculation unit
94*e*: Bleed-off valve target opening calculation unit
94*f*: Estimated bleed-off flow rate calculation unit
94*g*: Pump target flow rate calculation unit
94*h*: Pump target flow rate correction unit
94*i*: Pump flow control command output unit
94*j*: Boom direction control valve target meter-in opening calculation unit
94*k*: Boom direction control valve control command output unit
94*l*: Requested torque calculation unit
94*m*: Gravity moment calculation unit
94*n*: Inertia moment calculation unit
940: Target torque calculation unit
94*p*: Boom target bottom pressure calculation unit
94*q*: Bleed-off valve control command output unit
95: Boom operation lever
96, 97: Passage
201: Traveling body
202: Swiveling body (vehicle body)
203: Working device
204: Boom
204*a*: Boom cylinder (actuator)
205: Arm
205*a*: Arm cylinder (actuator)
206: Bucket
206*a*: Bucket cylinder (actuator)
207: Cabin
208: Engine room
209: Counterweight
210: Control valve
211: Swivel motor (actuator)
212 to 216: Inertial measurement device
901: Hydraulic excavator (working machine)
902: Hydraulic drive device.

The invention claimed is:

1. A work machine comprising:
a vehicle body,
a working device attached to the vehicle body,
an actuator for driving the working device,
a hydraulic pump,
a direction control valve for controlling a flow of pressurized oil supplied from the hydraulic pump to the actuator,
an operation lever for instructing the operation of the actuator, and
a controller that controls the direction control valve according to an input amount of the operation lever, wherein
the work machine comprises:
an inertial measurement device that detects the posture and operating state of the working device, and
pressure sensors that detect a meter-in pressure and a meter-out pressure of the actuator, and
the controller is configured to
calculate a target speed of the working device according to the input amount of the operation lever,
calculate a actuator target flow rate that is a target value of the flow rate supplied to the actuator based on the target speed,
calculate a pump target flow rate that is a target value of a discharge flow rate of the hydraulic pump, based on the actuator target flow rate,
calculate the target meter-in pressure that is a target value of the meter-in pressure, based on the input amount of the operation lever, the output value of the inertia measuring device, and the meter-out pressure,
calculate a difference between the speed of the working device obtained by the inertia measuring device and the target speed as a speed error,
calculate a difference between the meter-in pressure and the target meter-in pressure as a pressure error,
correct the pump target flow rate according to the speed error and the pressure error.

2. The work machine according to claim 1, wherein
the controller is configured to
calculate a speed correction flow rate by multiplying a speed feedback gain to the speed error,
calculate a pressure correction flow rate by multiplying a pressure feedback gain to the pressure error, and
correct the pump target flow rate by adding the speed correction flow rate and the pressure correction flow rate to the pump target flow rate.

3. The work machine according to claim 2, wherein
the pressure feedback gain is set to increase as the speed error increases.

* * * * *